United States Patent [19]

deBuhr et al.

[11] 4,269,017
[45] May 26, 1981

[54] HARVESTER HEADER WITH A MAIN FRAME OF MODULAR SUBFRAMES

[75] Inventors: Harold E. deBuhr; Henry W. Suechting, both of Ottumwa, Iowa

[73] Assignee: Deere & Company, Moline, Ill.

[21] Appl. No.: 74,575

[22] Filed: Sep. 11, 1979

[51] Int. Cl.³ ............................................. A01D 45/02
[52] U.S. Cl. ........................................... 56/106; 56/98
[58] Field of Search .................... 56/98, 106, 119, 105

[56] References Cited

U.S. PATENT DOCUMENTS

| | | | |
|---|---|---|---|
| 1,854,554 | 4/1932 | Madden | 56/106 |
| 3,759,021 | 9/1973 | Schreiner et al. | 56/106 |
| 3,808,783 | 5/1974 | Sutherland et al. | 56/106 |
| 4,086,746 | 5/1978 | Greiner et al. | 56/106 |
| 4,204,387 | 5/1980 | Eistert et al. | 56/98 |

*Primary Examiner*—Paul J. Hirsch

[57] ABSTRACT

A multirow header for cutting and conveying standing row crops from a standing position in the field into the crop receiving throat of the attached harvester for crop processing. The header comprises a main frame comprised of mechanically attached, modular-type subframes. Included among the mechanically attached subframes are a rear attachment frame, a pair of sealed gear cases which form the basic central subframe of the header, and a plurality of row unit frames.

7 Claims, 10 Drawing Figures

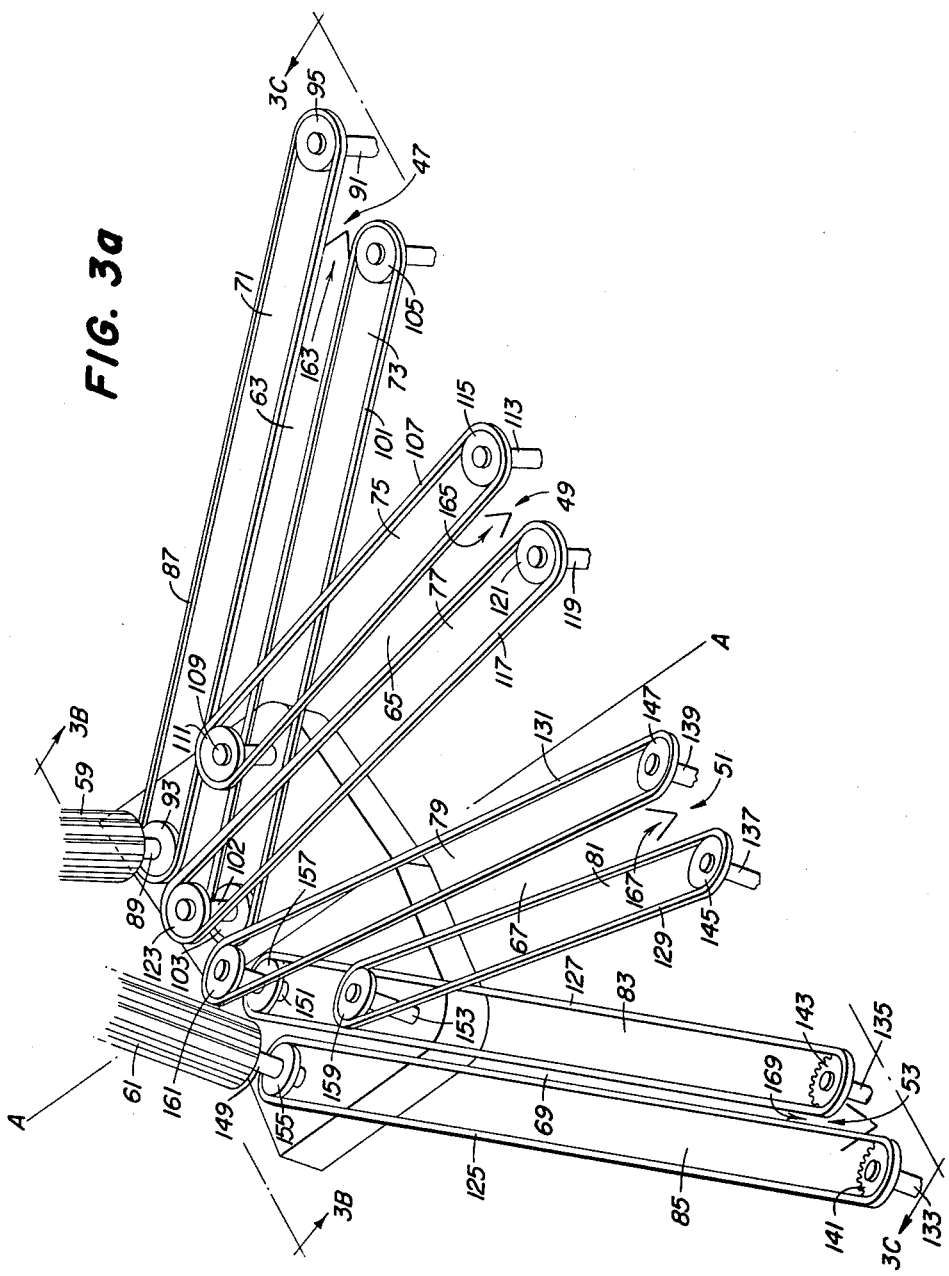

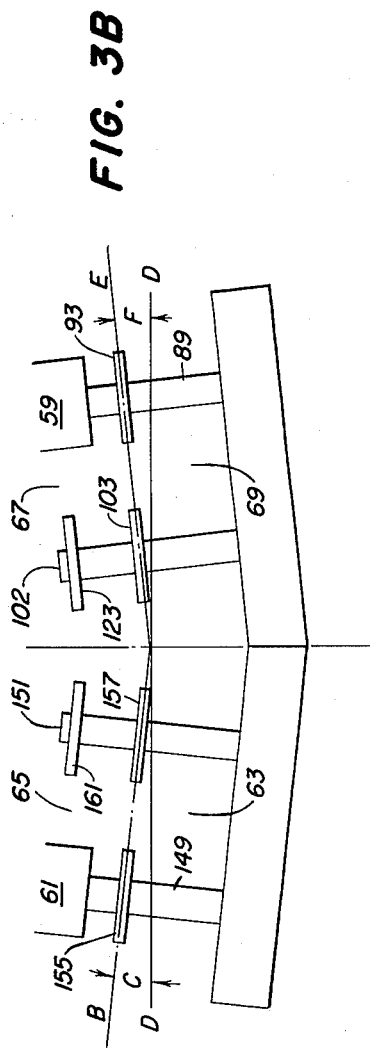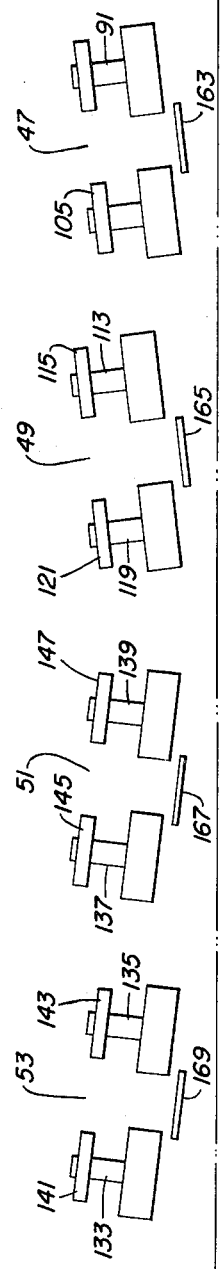

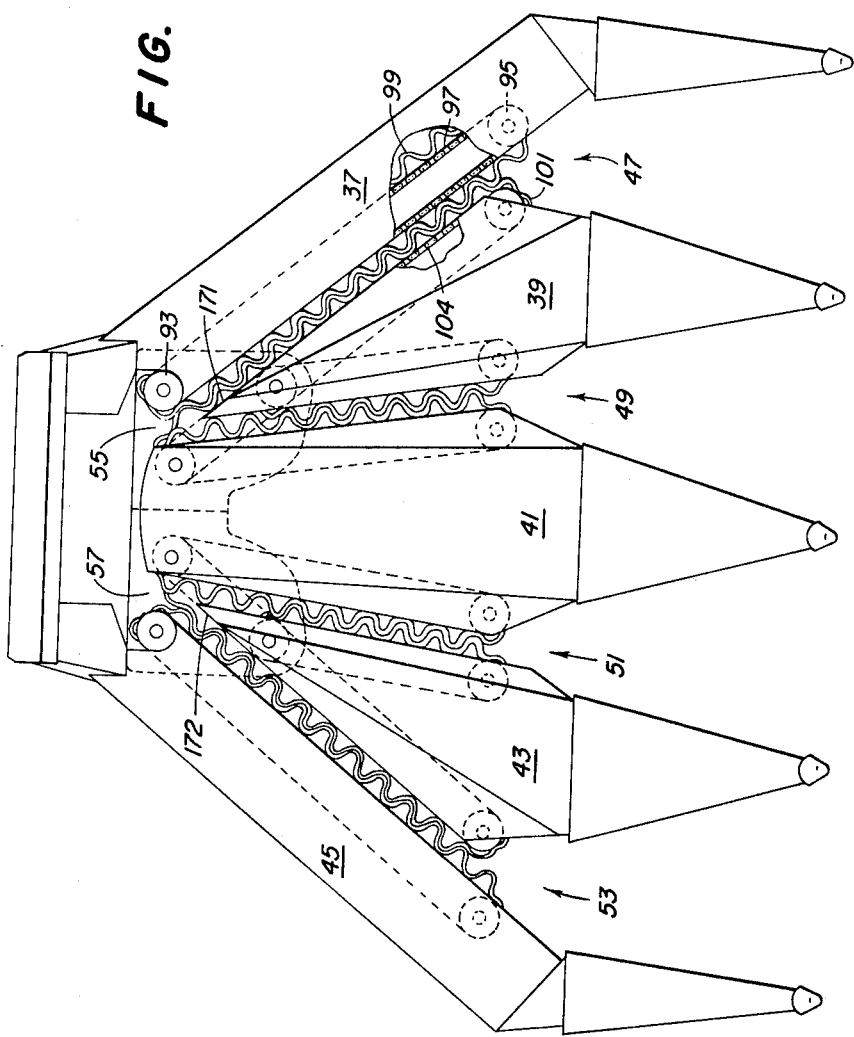

HARVESTER HEADER WITH A MAIN FRAME OF MODULAR SUBFRAMES

CROSS REFERENCES TO RELATED APPLICATIONS

U.S. patent application, Ser. No. 74,265, filed simultaneously herewith in the names of Jerke et al, entitled HARVESTER HEADER WITH TRANSVERSELY INCLINED, OVERLAPPING CONVEYORS and assigned to the assignee of the invention herein, is directed in a preferred embodiment to a four-row, row crop, forage harvester header with a first and second pair of conveyors parallel to each other and transversely inclined relative to a horizontal and to the third and fourth pairs of conveyors parallel to each other. The second and third pairs of conveyors are vertically spaced above and in overlapping relationship with the first and fourth pairs of conveyors respectively. The invention disclosed and claimed in application, Ser. No. 74,265, is disclosed herein in Sections II, IV and VI solely for the purpose of completeness of description of the operative environment of the invention claimed herein and thus forms no part of the invention claimed herein.

U.S. patent application, Ser. No. 74,564, filed concurrently herewith in the names of Guiter et al, entitled HARVESTER HEADER WITH SUPPORTING STAND and assigned to the assignee of the invention herein, is directed to a forage harvester header with a stand for supporting the rear of the header when the header is not attached to a forage harvester. The invention disclosed and claimed in application, Ser. No. 74,564, is disclosed herein in Section IX solely for the purpose of completeness of description of the operative environment of the invention claimed herein and thus forms no part of the invention claimed herein.

U.S. patent application, Ser. No. 74,561, filed concurrently herewith in the names of Dolberg et al, entitled FORAGE HARVESTER HEADER WITH UPPER STALK CONTROL and assigned to the assignee of the invention herein, is directed to a forage harvester header with an upper stalk control for subdividing the stalks from the total number of rows accommodated by the header into at least two groups for conveying into the harvester. The invention disclosed and claimed in application, Ser. No. 74,561, is disclosed herein in Section V solely for the purpose of completeness of description of the operative environment of the invention claimed herein and thus forms no part of the invention claimed herein.

U.S. patent application, Ser. No. 74,567, filed concurrently herewith in the name of deBuhr, entitled HARVESTER HEADER WITH REARWARDLY EXTENDED CROP DIVIDER and assigned to the assignee of the invention herein, is directed to a forage harvester header with a crop divider having a rearward extension to aid in continuing the positive feeding of crop material into the throat of a harvester. The invention disclosed and claimed in application, Ser. No. 74,567, is disclosed herein in Section III solely for the purpose of completeness of description of the operative environment of the invention claimed herein and thus forms no part of the invention claimed herein.

U.S. patent application, Ser. No. 74,563, filed concurrently herewith in the name of Guiter, entitled HARVESTER HEADER WITH DRIVE MECHANISM FOR OSCILLATING KNIFE CUTTERS and assigned to the assignee of the invention herein, is directed to a forage harvester header with an improved drive mechanism for interconnecting two remote cutters to a remote drive input gear train. The invention disclosed and claimed in application, Ser. No. 74,563, is disclosed herein in Section VII solely for the purpose of completeness of description of the operative environment of the invention claimed herein and thus forms no part of the invention claimed herein.

BACKGROUND OF THE INVENTION

This invention relates to harvester headers and more particularly to the construction of frames for such headers. The invention has particular utility for a forage harvester header but it may also have application to other agricultural equipment such as combine headers.

Forage harvester headers are used to cut and convey standing row crops from a standing position in the field to the harvester for processing. Heretofore, frames for such headers were made by welding together a plurality of subframes into a weldment of the general configuration of the header. It is also conventional to add strength and rigidity to the weldment by the provision of a transverse beam welded to the bottom rear of the header. The functional components were mechanically attached by bolting or welding directly to the weldment or main frame.

The use of a weldment as a main frame for a header has given rise to a number of problems. First, it is difficult to align accurately the subframe for welding often resulting in the manufacture of misaligned or dimensionally inaccurate frames. Secondly, the welding operation, by the application of heat, inherently causes distortion of the parts. A misaligned or inaccurate frame can lead to inoperability or poor functioning of the functional components which are attached to the frame. Sometimes, the misalignment of frames can be corrected by rewelding or by machining some of the frame surfaces to tolerance. Even when these solutions are practical, they are costly.

OBJECTS AND SUMMARY OF THE INVENTION

Accordingly, it is an object of this invention to provide an improved header having a frame comprised of modular mechanically attached subframes.

Another object of this invention is to provide a header with a frame having improved dimensional accuracy.

These and other objects of the invention are accomplished by a multirow header comprising a main frame comprised of mechanically attached, modular-type subframes. The subframes include a rear attachment frame couplable to a harvester. A first and second sealed gear cases are attached mechanically together and are attached to the rear frame. The gear cases form the basic central subframe of the header. A first and second row unit frames are mechanically attached to the first gear case and a third and fourth row unit frames are mechanically attached to the second gear case. A first and second pair of conveyors are attached to and extend generally fore-and-aft between the forward ends of the first and second row unit frames, respectively, and the first gear case for conveying crop material from its standing position in the field to a crop receiving throat of the harvester. A third and fourth pair of conveyors are attached to and extend generally fore-and-aft between the forward ends of the third and fourth pair of row unit frames, respectively, and the second gear case. The drive input gear trains for the first and second conveyors are enclosed in the first sealed gear case and the drive input gear trains for the third and fourth pair of conveyors are enclosed in the second gear case.

BRIEF DESCRIPTION OF THE DRAWINGS

FIG. 3A is a schematic, perspective view of the crop conveyors of the header shown in FIG. 2.

FIGS. 3B and 3C show rear and front elevations, respectively, of the header of FIG. 2 taken along lines 3B—3B and 3C—3C, respectively, of FIG. 3A.

FIG. 4 shows a plan view of the header shown in FIG. 2.

DESCRIPTION OF THE PREFERRED EMBODIMENT

Such terms as forward, rearward, vertical, horizontal, lateral are used for convenience and are determined by reference to the machine in its standard operating position and relative to the direction of forward travel. The terms left and right are determined by standing at the rear of the machine and facing in the direction of travel.

I. General

Figure 1:
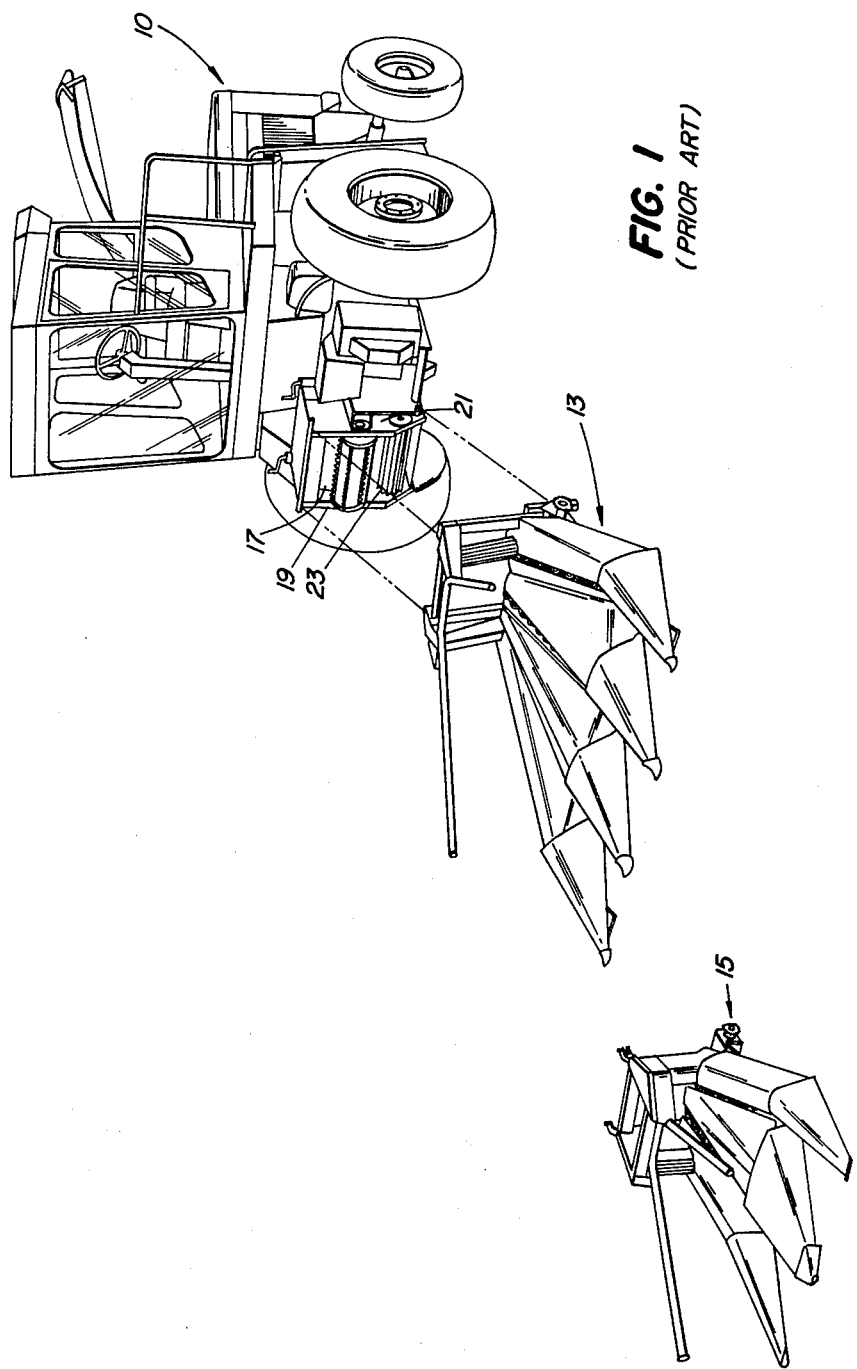
FIG. 1 shows a perspective view of a prior art forage harvester, a prior art two-row header and a prior art three-row header.

Referring to FIG. 1, a prior art forage harvester 10, three-row row crop header 13 and two-row row crop header 15 are shown. The harvester 10 and headers 13, 15 are used to harvest a variety of row crops such as corn, sorghum, sugar cane and the like. Headers 13, 15 are alternatively and interchangeably mountable on harvester 10, the details of construction of which are shown in greater detail in U.S. Pat. No. 3,701,239, the disclosure of which is hereby incorporated by reference herein. Harvester 10 has a generally rectangular inlet or throat 17 which spans the width between opposite side walls 19, 21. A pair of transversely oriented, vertically spaced feed rolls 23 are mounted in throat 17. Headers 13, 15 are interchangeably mounted on harvester 10 using a conventional attaching bracket such as shown in U.S. Pat. No. 3,791,117, the disclosure of which is hereby incorporated herein by reference and which also describes header 13 in greater detail. As is well known, a crop entering through throat 17 passes between feed rolls 23 to a second pair of feed rolls (not shown) which feed the crop over a shear bar (not shown) to a cylinder-type cutterhead (not shown) for cutting the crop into small pieces.

Figure 2:
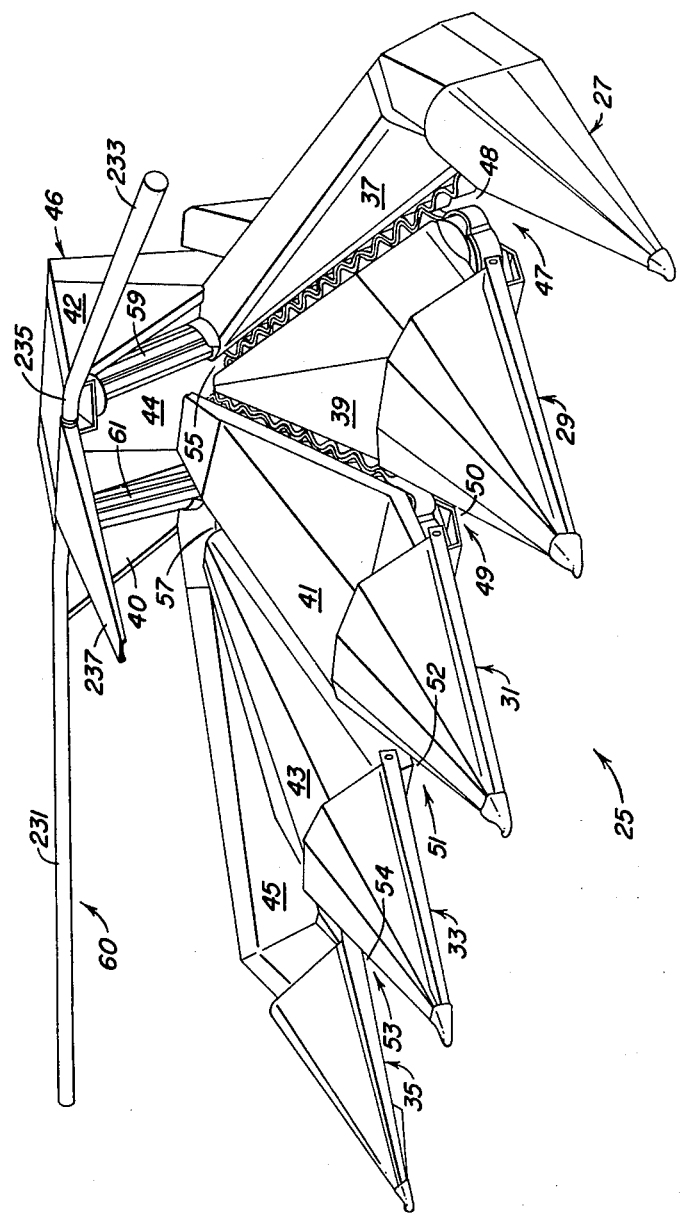
FIG. 2 shows a perspective view of a four-row header in accordance with a preferred embodiment of this invention.

The invention herein is explained in reference to and embodied preferably in a four-row row crop header such as header 25 shown in FIG. 2. It will be recognized by those skilled in the art that while this invention has primary application to four-row headers, it may be used in the design of headers accommodating more or less than four rows.

Header 25 is mountable interchangeably and alternatively, with headers 13, 15 on harvester 10. Header 25 comprises five transversely spaced, side by side, generally fore-and-aft, rearwardly converging, downwardly and forwardly inclined crop dividers 27, 29, 31, 33, 35 and for convenience are hereinafter referred to as first, second, third, fourth and fifth crop dividers from left to right on the machine. Crop dividers 27, 29, 31, 33, 35, respectively, include fenders 37, 39, 41, 43, 45, which terminate respectively in points. As is well known, the points of the dividers ride along the ground between the rows of standing crop as the harvester/header combination advances to separate down and tangled crop. The fenders present smooth upper surfaces which allow the crop to slide rearwardly along the top surface of the fenders through an opening 44 in a rear attachment frame 46 of header 25 and into throat 17 of harvester 10. The space between crop dividers 27 and 29 form a generally fore-and-aft, upwardly and rearwardly inclined crop receiving passageway 47 with a crop entry 48 and a crop exit 55. Similarly, a second passageway 49 with an entry 50 and exit 55 (in common with the exit of passageway 47) is defined between crop dividers 29, 31; a third passageway 51 with an entry 52 and exit 57 is defined between crop dividers 31, 33; and a fourth passageway 53 with an entry 54 and exit 57 (in common with the exit of passageway 51) is defined between crop dividers 43, 45. All passageways 47, 49, 51, 53 converge rearwardly because the spacing between the four crop rows which are respectively received in the passageways is substantially greater than the width of harvester throat 17. In the illustrated embodiment, the crop entries 48, 50, 52, 54 of the passageways (center to center) are spaced about 75 cm. apart to accommodate 75 cm. rows in the crop. The width of the throat, i.e., the distance between the side walls 19, 21 is approximately only 55 cm. Passageways 47, 49 converge together or intersect at exit 55 and passageways 51, 53 converge together at exit 57. Exits 55, 57 are spaced forwardly of the plane of the throat 17, a distance of 18 cm. in the illustrated preferred embodiment.

A pair of power driven rollers 59, 61 are provided on each side of header opening 40 to aid in directing and moving down crop material which may overlap fenders 37, 45.

An upper stalk control 60 is attached to the top of rear frame 46 to aid in converging crop stalks as they are conveyed through passageways 47, 49, 51, 53 and to insure that the stalks are fed butt end first by holding the top of the stalks out of opening 44 until the stalk butts are fed into throat 17.

II. Crop Conveyors

Reference is now made to FIG. 3A showing a perspective view of header 25 with crop dividers 27, 29, 31, 33, 35 removed exposing a plurality of schematically illustrated pairs of coplanar, downwardly and forwardly inclined conveyors 63, 65, 67, 69 (refered to hereinafter for convenience as first, second, third and fourth). Reference is also made to FIG. 4 which shows in fragmentary form a pair of conveyors in full detail as would be seen with only the crop dividers 27, 29, 31, 33, 35 removed. The first pair of coplanar conveyors 63 includes an outer conveyor 71 and an inner conveyor 73 disposed on opposite sides of passageway 47 and having inner runs alongside passageway 47 for engaging and moving crop therein to the crop exit 55 of passageway 47. Similarly, pair of coplanar conveyors 65 includes outer conveyor 75 and inner conveyor 77 disposed on opposite sides of the second passageway 49; the third pair of coplanar conveyors 67 includes inner conveyor 79 and outer conveyor 81 disposed on opposite sides of the third passageway 51 and the fourth pair of coplanar conveyors 69 includes inner conveyor 83 and outer conveyor 85 disposed on opposite sides of the fourth passageway 53. For convenience of description, each conveyor 71, 73, 75, 77, 79, 81, 83, 85 as schematically illustrated has a major component which is substantially longer and wider than it is thick and, thus, is referred to herein as being substantially planar (realizing that it might be more accurate to refer to a plane of symmetry or upper and lower boundary planes defined by the top and bottom surfaces, respectively, of the conveyors).

Important features of the conveyor design are (1) the conveyors of each pair are parallel, (2) the first and second conveyor pairs 63, 65 are parallel, (3) the third and fourth conveyor pairs 67, 69 are parallel, and (4) conveyor pairs 63, 65 are inclined transversely relative to a horizontal and relative to conveyor pairs 67, 69 which are also transversely inclined relative to a horizontal. Reference is now made to FIGS. 3A and 3B (which are rear and front elevations of FIG. 3, respectively) where these features are illustrated in reference to the preferred embodiment. The planes of the conveyors intersect along lines lying in a vertical plane passing through a longitudinal center line A—A. In the illustrated embodiment, the plane B formed by conveyor pair 63 forms an angle C equal to about 6½ degrees with a horizontal line D—D. Similarly, the plane E formed by conveyor pair 69 forms an angle F equal to about 6½ degrees with horizontal line D—D. Although not illustrated, the lateral inclination of conveyor pair 65 is the same as that of conveyor pair 63 and thus forms an angle of about 6½ degrees with horizontal line D—D. Similarly, the lateral inclination of conveyor pair 67 is equal to that of conveyor pair 69 and, thus, also forms an angle of 6½ degrees with horizontal line D—D. The relative lateral inclinations of the conveyor pairs is a key factor in the ability to convey and converge four rows of crop into the narrow throat 17 of harvester 10 resulting from the fact that the crop exits 55, 57 of passageways 47, 49, 51, 53 are closer to center line A—A of header 25 compared to prior art conveyor designs having horizontal transverse orientation (assuming the crop exits are substantially coplanar relative to a transverse vertical plane). It will be recognized by those skilled in the art that the angles of lateral inclination (FIG. 3B) of the conveyors relative to line D—D may be varied to vary the spacing between exits 55, 57.

Another key feature contributing to the efficient use of the area adjacent opening 44 and the ability to converge and convey four rows of crop material into narrow opening 44 is provided by the elevation and overlapping of conveyor pair 65 over conveyor pair 63 and by the elevation above and overlapping of conveyor pair 67 over conveyor pair 69. Two design features are utilized to enable the overlapping of the conveyor pairs on the left side and the overlapping of the conveyor pairs on the right side. The first is the design of the conveyor drive means such that (1) conveyors 77, 73 have a common drive shaft 102 and (2) conveyors 79, 83 have a common rear drive shaft 151. The second is the termination of the rear end of conveyor 75 substantially forward of the adjacent conveyors 71, 73 and 77 and the termination of the rear end of conveyor 81 substantially forward of the adjacent conveyors 79, 83, 85. While the feature of the elevation and overlapping of one conveyor pair over an adjacent conveyor pair as explained herein has primary application to a four-or-more-row header, it will be appreciated by those skilled in the art that it is equally applicable to a two-row header. These features will become more apparent from the following detailed description of the conveyors.

Each conveyor is comprised of an endless loop means and a drive means including front idler and rear drive shafts. The front idler and rear drive shafts on the left side of header 25 are all mutually parallel. The front idler and rear drive shafts on the right side are all also mutually parallel. Conveyor 71 is illustrative and is comprised of an endless loop means 87 trained about a rear drive shaft 89 and front idler shaft 91. Rear and front shafts 89, 91 are provided with drive member 93 and idler member 95, respectively, through which driving engagement is provided between the drive shafts 89, 91 and the endless loop means 87. A preferred embodiment of endless loop means 87 is disclosed in U.S. Pat. No. 3,339,354, the disclosure of which is hereby incorporated by reference herein, and referring now to FIG. 4, comprises a chain 97 trained about front and rear drive sprockets or drive member 93 and idler member 95. A belt 99 is attached to chain 97 at intervals and forms generally outwardly extending sinusoidal loops which extend into the passageway 47 and intermesh with the loops in a similar belt 101 attached to a chain 103 of adjacent conveyor 73. The construction of the endless loop means for the remainder of the conveyors are 75, 77, 79, 81, 83, 85 is conventional and identical to that described for conveyors 71, 73 and will not be described in further detail herein. It will be apparent to those skilled in the art that there are other commerically acceptable constructions of endless loop means such as illustrated in U.S. Pat. No. 4,106,270 and while less preferred, may be used interchangeably with the preferred design described above in accordance with the features of this invention. In addition, while the provision of driving engagement between endless loop means 87 and shafts 89, 91 through chain 97 and sprockets 93, 95 is greatly preferred, it will be recognized that endless loop belts and pulleys or other equivalents may be substituted therefor.

Conveyor 75 comprises an endless loop means 107 trained about a rear drive shaft 109 with drive member 111 thereon and a forward idler shaft 113 with a drive member 115 thereon. The rear termination of conveyor 75 is substantially forward of the rear termination of adjacent conveyor 71, 73, 77 so that passageways 47, 49 intersect slightly forward of throat 17.

Conveyor 77 which cooperates with conveyor 75 is comprised of an endless loop means 117 trained about a forward idler shaft 119 with a drive member 121 and rear drive shaft 102 with a second drive member 123 provided thereon coaxial with drive member 103 such that rear drive shaft 102 becomes a common drive shaft for conveyor 77 and conveyor 73.

The right half of header 25 is a mirror image of the left half and will not be described in great detail. Conveyors 85, 83, 81 and 79 are comprised of endless loop means 125, 127, 129, 131 which are trained about four mutually parallel forward idler shafts 133, 135, 137, 139 with idler members 141, 143, 145, and 147 provided thereon and mutually parallel rear drive shafts 149, 151, 153 with drive members 155, 157, 159, 161 provided thereon. With this conveyor arrangement, passageways 51, 53 intersect and thereby converge crop material conveyed therein slightly forward of the throat 17. Thus, as the machine advances and four rows of row crops enter the respective passageways, two of the rows are initially converged together in passageways 47 and 49 forward of throat 17; two are coverged in passageways 51, 53 forward of throat 17; and thereafter the converged crop from the left half of the header is coverged with the converged crop from the right half within throat 17.

Another advantage resulting from the use of transversely inclined, vertically spaced and overlapping conveyors as in the preferred embodiment is that it is possible to determine the transverse inclination such that the conveyors terminate at the forward end in a common transverse vertical plane (FIG. 3A) and at an equal distance above the ground (FIG. 3C). As will be described in more detail later, this orientation of the forward conveyor ends is important to locating crop cutters 163, 165, 167, 169 adjacent to the forward ends and in the same orientation.

Figure 5:
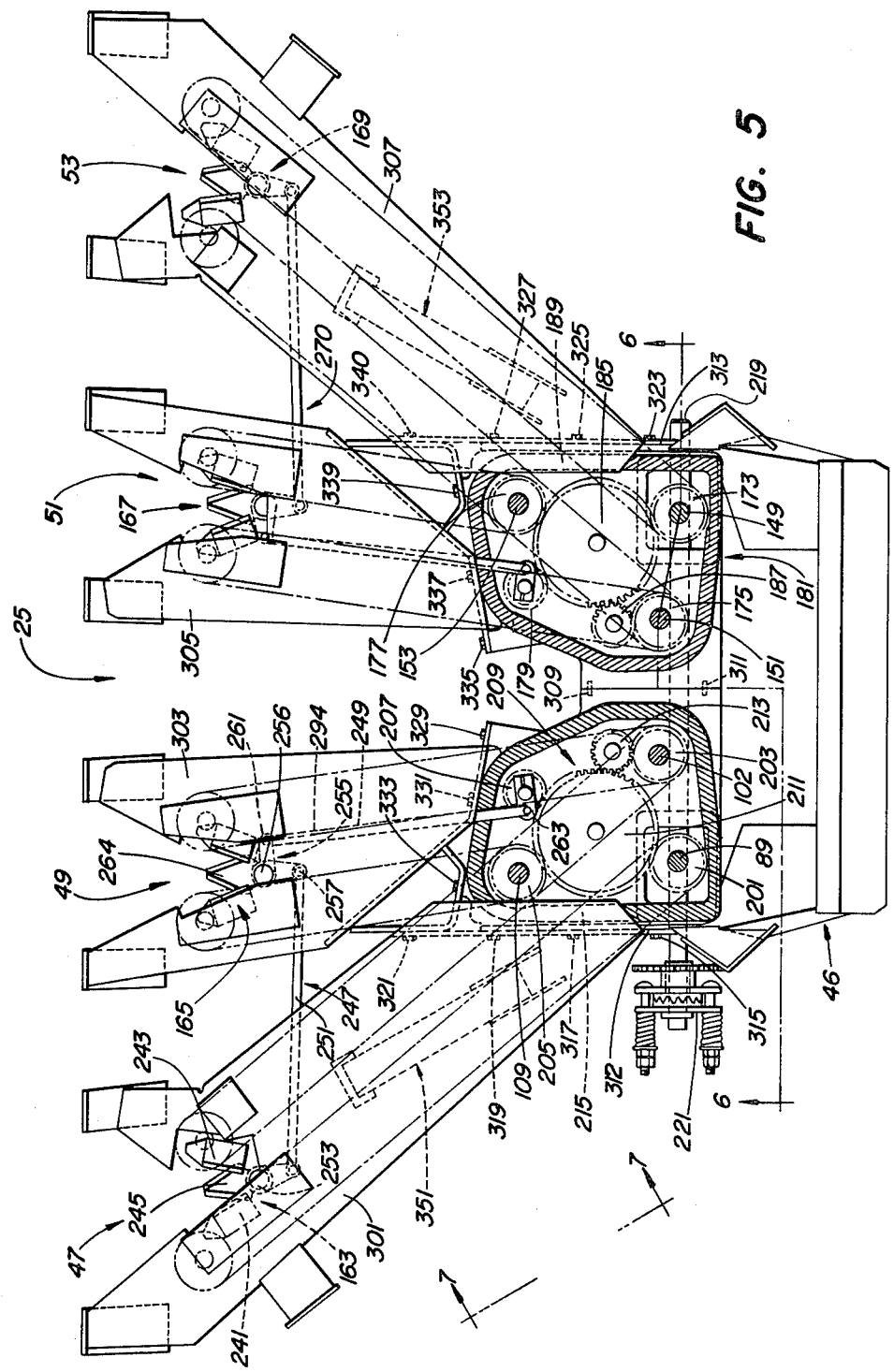
FIG. 5 shows a fragmentary, plan view of the header shown in FIG. 2.
Figure 6:
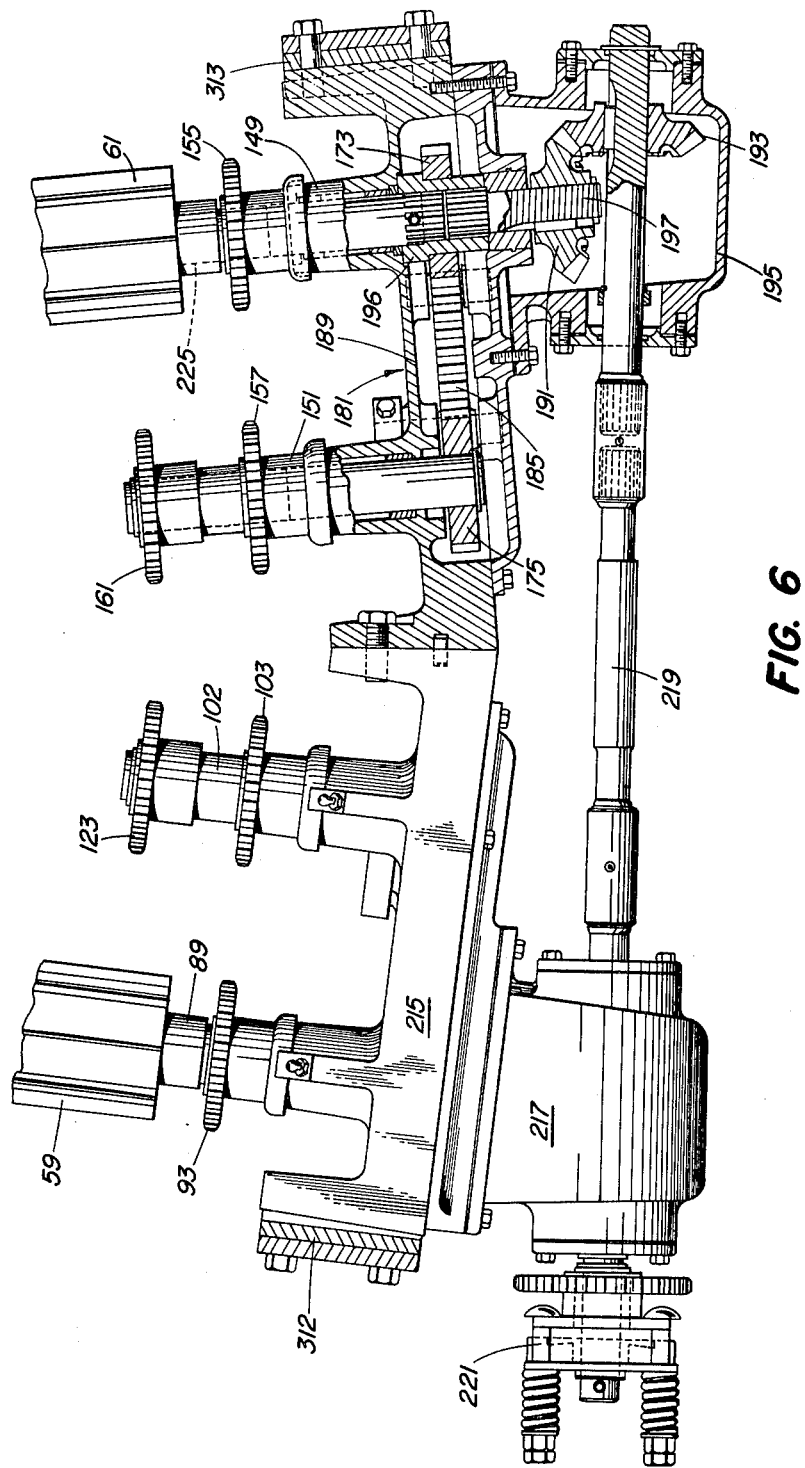
FIG. 6 shows a fragmentary, schematic, rear elevation of the header of FIG. 2 taken along line 6—6 of FIG. 5 with certain components omitted in FIG. 5 shown herein for clarity.

Reference is now made to FIGS. 5 and 6 wherein additional components of the conveyor drive means are shown. In FIG. 5, for clarity, the input drive gear trains are exposed by (1) removal of crop dividers 27, 29, 31, 33, 35 and of the rear drive members for each conveyor, (2) showing the endless loop means and associated front idler shafts of each conveyor in schematic (dotted lines) form, (3) removal of the top of sealed gear cases in which an input drive gear train is enclosed. FIG. 6 is a view taken along line 6—6 of FIG. 5 except that certain of the rear drive shafts (not shown in FIG. 6) have been illustrated. Referring to the right side of header 25, rear drive shaft 149, 151, 153 are provided with coaxial input gears 173, 175, 177, respectively, spaced below drive members 155, 157, 159, respectively (FIGS. 3A, 6). Also interconnected in the input drive gear train for conveyor pairs 67, 69 is an input gear 179 for a cutter drive means for cutter means 167, 169. An idler gear train 181 including idler gears 185 and 187 couples input gears 173, 175, 177, 179. Idler gear train 181 and input gears 173, 175, 177, 179 are housed in a sealed gear case 189 and are driven through bevel gears 191, 193 (FIG. 6) housed in bevel gear case 195. Bevel gear 191 is mounted coaxially of input drive shaft 197 which is coaxially coupled with rear drive shaft 149 by a splined coupling hub 196.

The input drive gearing for conveyor pair 63, 65 is a mirror image of that provided for conveyor pairs 67, 69 and will be only briefly described herein. Rear drive shaft 89, 102, 109 are provided with input drive gears 201, 203, 205, respectively, and are coupled with an input gear 207 for a cutter drive for cutter means 163, 165 through an input gear means 209 comprising input gears 211, 213. The input gear train is housed in a second sealed gear case 215 and is driven through a pair of bevel gears (not shown) provided in a bevel gear housing 217. The two sets of bevel gears are interconnected and are synchronously driveable via drive shaft 219. Drive shaft 219 is driveable through a conventional friction clutch 221 which is in turn connected to the drive train (not shown) of harvester 10. It will be recognized by those skilled in the art that while a gear train for the cutter and conveyor input drive trains is preferred, drive trains of chain and sprockets or other equivalents may be substituted therefor.

It will also be appreciated that the compact, centralized, coaxial disposition of the conveyors and cutter input drive trains enable practical enclosure in sealed gear cases promoting less maintenance and longer gear life. Also, easy access is permitted to the gear trains when repair or maintenance is necessary.

III. Crop Dividers

Reference is now made to FIG. 4 which shows in schematic form the placement of fenders 37, 39, 41, 43, 45 over conveyors 71, 73, 75, 77, 79, 81, 83, 85. Fender 39, which covers conveyors 73, 75, and defines, along its right side, one side of passageway 49, has a rear tip 171 extending substantially beyond the rear end of endless loop means 107 of conveyor 75 and terminating near the intersection of passageways 47, 49 (coterminous with crop exits 55). It has been found that rear tip 171 coacts with the sinusoidal belt of endless loop means 117 to provide positive feeding of crop material through passageway 49 beyond the termination of endless loop means 107 up to the intersection of passageways 47, 49 at the termination of rear tip 171. Crop reaching this point is easily fed into opening 44 and throat 17. Similarly, fender 43 has a rear tip 172 which coacts with endless loop means 131 to provide positive feeding of crop through passageway 51 beyond the termination of endless loop means 129 up to the intersection of passageways 51, 53 near the termination of rear tip 172 coterminus with crop exit 57. Thus, it will be appreciated by those skilled in the art that rear tips 171, 172 contribute respectively to the positive clog-free feeding of crop material through passageways 49, 51 despite the termination of endless loop means 107, 129 substantially forward of endless loop means 117, 131.

IV. Powered Rollers

Referring again to FIG. 2, 3A, the pair of generally upright fluted rollers 59, 61 are disposed forwardly of walls 40, 42 and extend upwardly from the rearward end of fenders 37, 45. The upper end of rollers 59, 61 are supported in brackets adjacent the upper stalk control 60. In the illustrated embodiment, the distance between the peripheries of the rollers immediately above passageways 47, 53 is approximately 58 cm. and the distance between the peripheries of the rollers immediately below the upper stalk control is approximately 48 cm. that is, the rollers are inclined upwardly and transversely toward each other. The transverse inclination of rollers 59, 61 tends to cause the crop material to slide down and compress for more efficient passage of the crop into throat 17. As indicated above, throat 17 in the illustrated embodiment is about 55 cm., and thus rollers 59, 61 are spaced immediately in front of sides 19, 21 of throat 17 to aid in the final convergence of the crop prior to entering throat 17. Roller 59, 61 (FIGS. 3A, 6) comprise axial shafts (one not shown and 225) which extend downwardly from the roller and are coaxially connected to rear drive shafts 89, 149 of conveyors 71, 85, respectively. Thus, rollers 59, 61 are driven in the same direction as endless loop means 87, 125 so that the inner sides of the roller move rearwardly. In operation, crop is engaged by the inner side of the rollers as it leaves passageways 47, 49, 51, 53 to assist in the convergence and feeding of the crop into throat 17. Roller 59, 61 coaxial, respectively, with drive shafts 89, 149 in addition to being transversely inclined toward each other are also somewhat upwardly and forwardly inclined.

V. Upper Stalk Control

Referring to FIG. 2 again, upper stalk control 60 extends forwardly from rear frame sides 40, 42 and includes a pair of forwardly diverging arms 231, 233, a central transverse portion 235 connecting arms 231, 233 and a centrally disposed wedge member 237. Arms 231, 233 are respectively disposed above and extend generally parallel to crop dividers 27, 35. Wedge member 237 is disposed above and extends generally parallel to crop divider 31. Wedge 237 and arm 233 engage the upper portion of upright crops entering passageways 47, 49 and converge the crop inwardly as the butt portions are converged upwardly and rearwardly along these passageways. Similarly, wedge 237 and arm 231 engage the upper portions of upright stalks entering passageways 51, 53 and converge the crops inwardly as the butt portions are converged upwardly and rearwardly along these passageways. When the upper portions of the crop reach the transverse central portion 235, rearward movement is blocked while the conveyors in all passageways continue to move the butt portions. This results in the crop being fed butt first through opening 44 and into throat 17. The centrally disposed wedge acts to subdivide the four-row header 25 into two somewhat independently functioning halves. Wedge 237 cooperates with passageways 47, 49 to converge the crop in the two rows on the left side together and cooperates with passageways 51, 53 to converge the crop in the two rows on the right side together prior to all four rows of crop being converged together in throat 17.

VI. Crop Cutter Means

Reference is again made to FIGS. 5, 3C, which show a plurality of cutter means for serving crop entering passageways 47, 49, 51, 53 including oscillating knife cutters 163, 165, 167 and 169 disposed below and adjacent to crop entries 48, 50, 52, 54 of passageways 47, 49, 51, 53, and below and adjacent the point at which a crop stalk is engaged by each pair of conveyors. As explained above, the orientation of the conveyors enables cutters 163, 165, 167, 169 to be collectively locatable in one transverse vertical plane at an equal distance above the ground. This promotes uniform crop cutting height and crop feeding into the header. Further, each cutter is disposed parallel to its corresponding conveyor pair (i.e., the cutting plane of the cutter is parallel to its adjacent pair of conveyors).

A preferred embodiment of the cutter 163, 165, 167, 169 is disclosed and claimed in U.S. application, Ser. No. 066,138, filed on Aug. 13, 1979 in the name of Dolberg, et al, and assigned to assignee of the invention herein, the disclosure of which is hereby incorporated by reference herein.

Cutter 163 is exemplary of the construction of the remaining cutters and is comprised of two fixed knives 241, 243 and a centrally disposed oscillating knife 245. Knife 245 is oscillatable relative to fixed knives 241, 243 and severs crop stalks with a scissor-like action.

VII. Cutter Drive Means

Referring to FIGS. 3C, 5, the cutter means for severing crop entering passageways 47, 49 further includes cutter drive means 247 comprised of a first reciprocatable rod 249 connected between cutter input gear 207 and cutter 165. A second reciprocatable rod 251 is interconnected between cutters 165, 163 to provide for synchronous oscillation. Pivotal connection of rod 251 to cutter 163 is provided via a pivot arm 250 connected to and pivotable with cutter pivot 253. Pivotable connection of rod 251 with cutter 165 is provided by pivotable connection of rod 251 to a first end 257 of a crank 255 connected to and pivotable with a pivot 256 of cutter 165. Pivotable connection of rod 249 with cutter 165 is provided by pivotable connection of rod 249 to a second end 261 of crank 255. Pivotable connection of rod 249 with gear 207 is provided via a pivot arm 263 connected to and rotatable with gear 207. In operation, input gear 207 is rotated and causes rod 249 to be reciprocated essentially longitudinally of the header 25. With reciprocation of rod 249 rearwardly, crank 255 is moved clockwise (in FIG. 5). Clockwise movement of crank 255 moves a knife 264 of cutter 165 (fixed to pivot 256) clockwise and also moves rod 251 to the right (in FIG. 5). Movement of rod 251 to the right in turn moves arm 250 clockwise (FIG. 5) and also oscillating blade 245 (fixed to arm 250 via pivot 253) clockwise. Forward movement of rod 249 moves crank 255 and pivot arm 250 counterclockwise which in turn moves blades 264 and 245 counterclockwise. The cutter means for cutters 167, 169 includes a cutter drive means 270 identical to cutter drive means 247 and will not be explained further herein. It can be seen that cutter drive means 247 provides a simple, trouble-free drive for two remotely disposed oscillating cutters which are in turn remotely disposed from spur gear case 215. The remote disposition of spur gear case 189 from cutter 163, 165 is also important so that the input drives for all components of the header are disposed adjacent to each other at the rear end of the header permitting their enclosure in a sealed gear case. The rear disposition of the gear case provides still other advantages, namely, (1) it is in close proximity to the conveyor drives, (2) it gives sufficient clearance above the ground, and (3) it allows easy access for maintenance and repair.

VIII. Header Frame

In accordance with another feature of this invention, the header frame is constructed from a plurality of modular-type mechanically attached subframes. Reference is now made to FIG. 5 in which the header frame is illustrated.

The header frame is comprised of spur gear cases 189, 215, rear attachment frame 46 and a plurality of generally fore-and-aft, downwardly and forwardly inclined row unit frames 301, 303, 305, 307. Gear cases 189, 215 form the basic central subframe of the header frame and are mechanically attached together at points 309, 311 with bolts. Rear attachment frame 46 includes a pair of fore-and-aft extending arms 312, 313 which are attached to the outer sides of the gear cases 215, 189 along with row unit frames 301, 307. Specifically, arm 312, row unit frame 301 are attached to gear case 215 at a plurality of points 315, 317, 319. Similarly, arm 313 and row unit frame 307 are attached to gear case 189 at a plurality of points 323, 325, 327.

Row unit frames 303, 305 are attached to forwardly facing sides of gear cases 215, 189, respectively. Specifically, row unit frame 303 is attached to gear case 215 at points 329, 331, 333 and row unit frame 305 is attached to gear case 189 at points 335, 337, 339. In addition, row unit frames 301, 303 are mechanically attached together at one or more points such as point 321 and row unit frames 305, 307 are mechanically attached at one or more points such as point 340.

It will be appreciated by those skilled in the art that the frame subunits must be mechanically attached at a number of points. The attachment points illustrated herein are intended to be merely representative of the attachment principle and not necessarily of the number and exact position of the points at which attachment may be required. Also, while mechanical attachment with bolts is preferred, other equivalent means may be substituted therefor.

It will also be appreciated that this modular approach to construction of the header frame will provide improved dimensional accuracy, simplicity and cost savings in the manufacture of a header frame in comparison to prior art techniques which utilized a massive weldment for the frame.

IX. Header Stand

Figure 7:
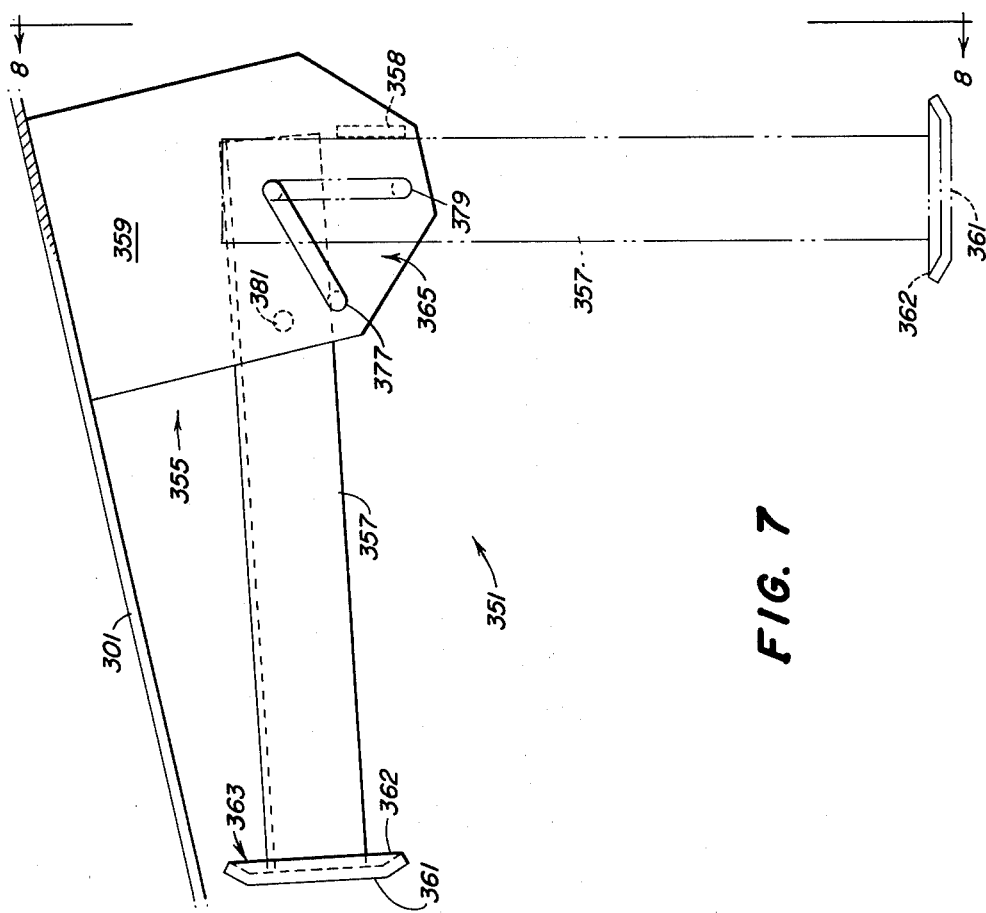
FIG. 7 shows a fragmentary side elevation of the header shown in FIG. 2 taken along line 7—7 of FIG. 5.

A stand is provided for supporting the rear end of header 25 when not attached to harvester 10. Reference is now made to FIG. 5 which shows a pair of stands 351, 353 attached to the bottom surface of row unit frames 301, 307, respectively, and here shown in storage position. Stand 351 is a mirror image of stand 353 and for convenience and brevity only stand 351 will be described in detail herein. Reference is now made to FIG. 7 which shows stand 351 as viewed from the left side of header 25 along line 7—7 and to FIG. 8 which shows a view of the stand 351 taken along line 8—8 of FIG. 7. Stand 351 is comprised of a bracket 355 including plates 360, 359 fixed to row unit frame 301. A leg 357 is disposed between and is freely pivotally mounted at one end to bracket 355 for movement between an elevated storage position and a lowered support position shown in full lines and dotted lines, respectively, in FIG. 7. Bracket 355 further includes a stop 358 against which leg 357 abuts in the support position. Leg 357 is provided with a flanged foot 363 including a central planar base 361 and a flanged outer rim 362 surrounding base 361 on all four sides. Rim 363 reduces the friction of foot 363 with the ground when aligning the header with the harvester for attachment.

Figure 8:
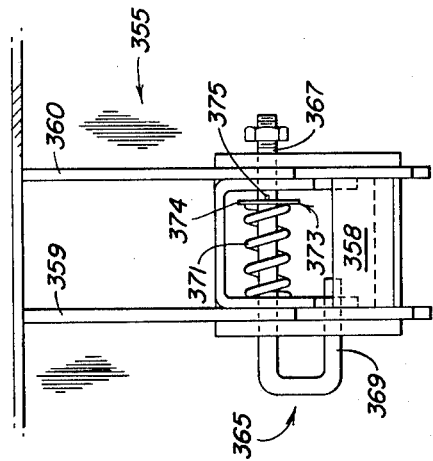
FIG. 8 shows a fragmentary elevational view of the header shown in FIG. 2 taken along line 8—8 of FIG. 7.

A stand 351 further includes a latch 365 for locking leg 357 in its storage position and in its support position and for serving as a pivotable mounting for leg 357 in bracket 355. Latch 365 is generally J-shaped and includes a first or pivot arm 367 interconnecting and pivotably mounting leg 357 in bracket 355 and a second or locking arm 369 for engaging and locking leg 357 alternatively in its storage position and in its support position. Latch 365 further includes a coil spring 371 surrounding pivot arm 367 and engaging a stop 373. Stop 373 is here shown as comprised of a washer coaxially mounted on leg 367 and a pin 375 inserted through pivot arm 367. As can be seen in FIG. 8, one end of coil spring 371 engages an inner side of leg 357 and the other end of the spring 371 engages washer 374 thereby biasing pivot arm 367 to the right in FIG. 8.

Latch 365 is moveable between a storage lock position shown in full lines in FIG. 7 and a support lock position shown in dotted lines in FIG. 7. In the storage lock position, locking arm 369 is inserted through a hole 377 in plate 359 and is in engagement with one side of leg 360, thereby locking leg 357 against movement from its storage position. In the support lock position, locking arm 369 is inserted through a hole 377 in plate 359 and through a hole 381 in leg 357, thereby locking leg 357 against movement from its support position.

In operation, when header 25 is attached to forage harvester 10, leg 357 is maintained in a storage position. When it is desired to remove header 25 from forage harvester 10, header 25 is hydraulically lowered (through means not shown) to its operating position with the forward end thereof in engagement with the ground. Latch 365 is pulled (with one hand) to the left (FIG. 8) against the bias of coil spring 371 to disengage locking arm 369 from opening 377. When locking arm 369 is withdrawn, leg 357 falls to its support position in engagement with stop 358 solely due to the force of gravity. Leg 357 is then locked in this position by counterclockwise rotation (FIG. 7) of latch 365 about pivot arm 367 and relative to leg 357 and bracket 355 until locking arm 369 is in alignment with hole 379. Latch 365 is then released and due to the bias of coil spring 371, locking arm 369 is inserted through holes 379, 381. The foregoing procedure is also followed for moving stand 353 from its storage position to its standing position. With the stands in their support position, the attaching bracket (not shown) for attaching rear frame 46 to the front of forage harvester 10 are disengaged. If the machine is on level ground, the feet of stands 351, 353 will engage the ground.

To reattach header 25 to forage harvester 10, the forage harvester is driven to an attachment position as near alignment as possible with the rear end of header 25. More precise alignment of header 25 is possible by slight transverse and longitudinal movement of header 25 on feet (foot 361) which movement is made easier due to the provision of flange rims (rim 362) on the feet. The height of the legs (leg (357) is determined such that the vertical alignment of the rear frame 46 with the front end of harvester 10 is sufficient to permit re-engagement of the mounting brackets (not shown) for header 25 on the forage harvester 10.

The stand is simple to operate by providing a unified member for latching and pivotally mounting leg 357. In addition, the movement of leg 357 from its storage position to its support position, solely due to the force of gravity, enables this operation to be accomplished through the use of one hand to retract latch 365, pivot it counterclockwise and release it into its support lock position. In addition, the use of a latch which is a permanent part of the stand avoids the risk that the locking arm or pin may become lost.

It will be appreciated by those skilled in the art that while this stand has particular application to attachments for agricultural equipment such as forage harvesters and combines, the advantages thereof would find utility in many other environments such as industrial construction equipment and other applications.

I claim:
1. In a header for a row crop harvester having a crop receiving throat, said header comprising:
   a rear attachment frame couplable to said harvester;
   first and second sealed gear cases attached together and attached to said rear frame;
   first and second row unit frames attached to and extending generally fore-and-aft from said first gear case;
   third and fourth row units frames attached to, and extending generally fore-and-aft from, said second gear case;
   first and second pairs of conveyors attached to and extending generally fore-and-aft between (1) the forward ends, respectively, of said first and second row unit frames, respectively, and (2) said first gear case;

third and fourth pairs of conveyors attached to and extending generally fore-and-aft between (1) the forward ends of said third and fourth row unit frames, respectively and (2) said second gear case; and each pair of conveyors defining therebetween a passageway with a crop entry and crop exit at the forward and rearward ends thereof, respectively, each pair of conveyors for conveying severed crop along said passageway defined therebetween and into said throat, said first and second conveyors comprising drive means having an input drive gear train enclosed in said first gear case, said third and fourth pair of conveyors comprising drive means having an input drive gear train enclosed in said second gear case;

wherein the improvement comprises the attachments between (1) the rear frame and the first and second gear cases, (2) the first gear case and the second gear case, (3) the first and second row unit frames and the first gear case, and (4) the third and fourth row unit frames and the second gear case being mechanical attachments.

2. The improvement of claim 1 wherein:

the drive means for each of said conveyors includes a forward idler shaft and a rear drive shaft; and each conveyor further comprising an endless loop means extending along one side of the passageway corresponding, respectively, to each of said conveyors, the endless loop means of each pair of conveyors engage and convey crop in the passageway therebetween, each said endless loop means mounted on and in driving engagement with said forward and rear shafts; and the inner conveyor of said first pair of conveyors and the outer conveyor of said second pair of conveyors have a common one of said rear drive shafts; and the inner conveyor of said third pair of conveyors and the outer conveyor of said fourth pair of conveyors have a common one of said rear drive shaft.

3. The improvement of claim 2 wherein:

each said rear drive shaft and each said forward idler shaft has a drive member and an idler member, respectively, thereon;

said common rear drive shaft each has a second drive member axially spaced thereon from said first drive member;

the driving engagement of said endless loop means of said inner conveyor of said first pair of conveyors and of said outer conveyor of said second pair of conveyors which said common rear drive shaft is provided through said first and second drive members, respectively, on said common rear drive shaft; and the driving engagement of each said endless loop means at the forward end thereof with each forward idler shaft is provided through said idler member.

4. The improvement of claim 3 wherein the endless loop means of the outer conveyor of said second and third pair of conveyors is terminated substantially forward of the endless loop means of the inner conveyors of the second and third pair of conveyors.

5. The improvement of claim 3 wherein the passageways of said first and second pair of conveyors intersect forward of said throat and said passageways of said third and fourth pair of conveyors intersect forward of said throat.

6. The improvement of claim 1 wherein the rear end of said second pair of conveyors is spaced vertically from and in overlapping relationship with the rear end of the first pair pair of conveyors; and the rear end of the third pair of conveyors is spaced vertically from and in overlapping relationship with the fourth pair of conveyors.

7. The improvement of claim 1 wherein:

each said conveyor is substantially planar and each said pair of conveyors is substantially coplanar, said first and second pair of conveyors lie in parallel planes and said third and fourth pair of conveyors lie in parallel planes; and said first and second pairs of conveyors inclined transversely and downwardly in a direction toward the third and fourth pairs of conveyors and the third and fourth pair of conveyors are inclined transversely and downwardly in a direction toward said first and second pair of conveyors.

* * * * *